Sept. 28, 1971  L. C. MORTON  3,608,124
CLIP FOR WINDSHIELD WIPER BLADE
Filed April 28, 1970
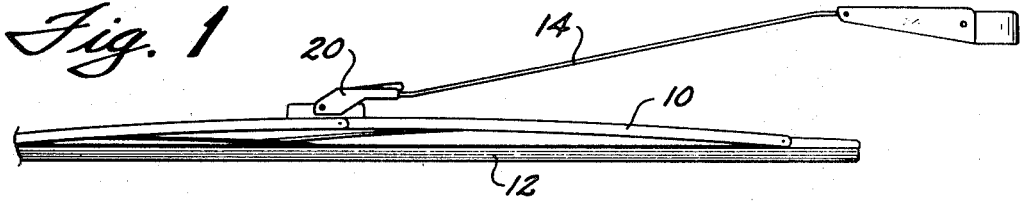
*Fig. 1*
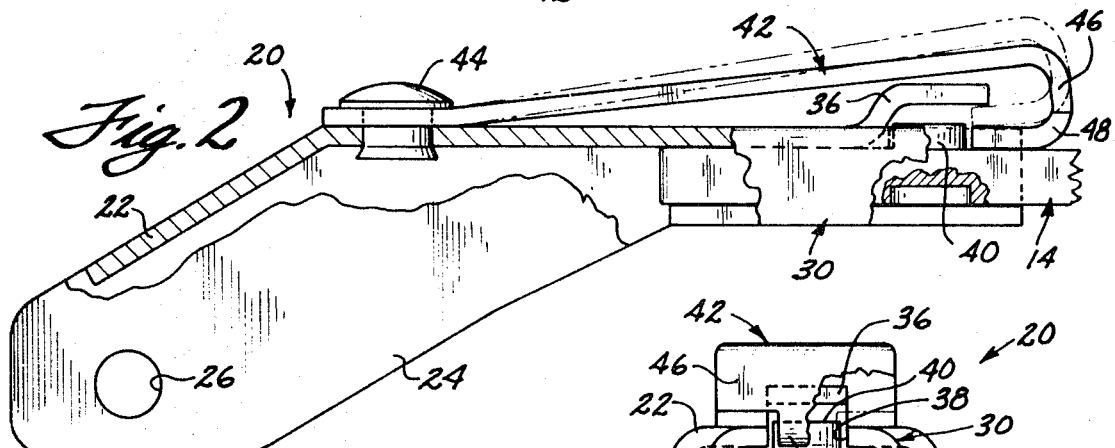
*Fig. 2*
*Fig. 3*
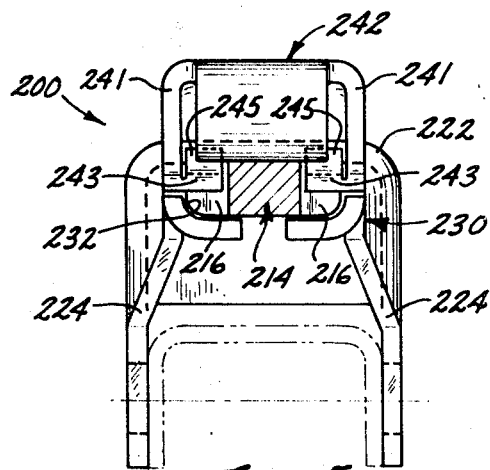
*Fig. 5*
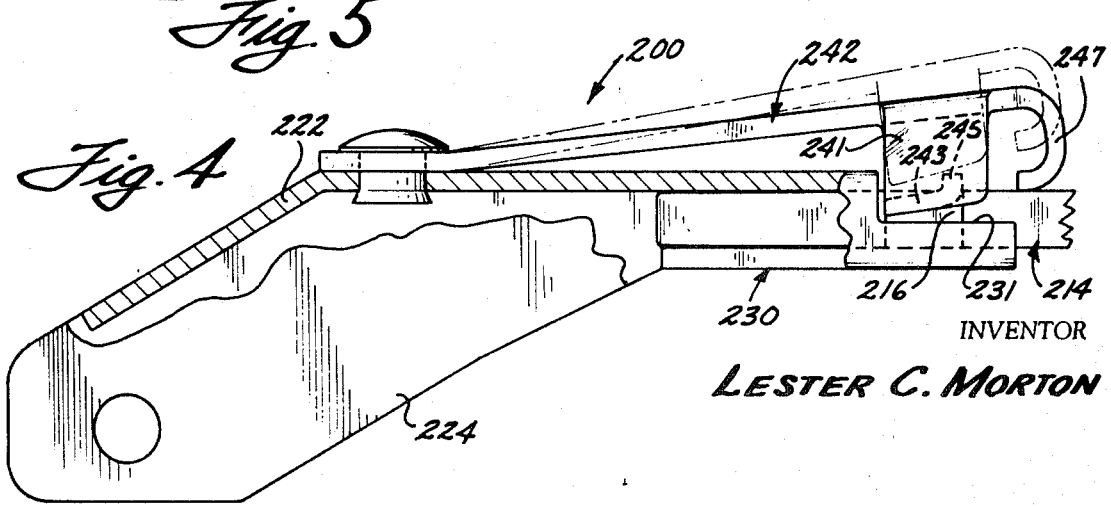
*Fig. 4*
INVENTOR
LESTER C. MORTON United States Patent Office 3,608,124
Patented Sept. 28, 1971

3,608,124
CLIP FOR WINDSHIELD WIPER BLADE
Lester C. Morton, Antrim, Northern Ireland, assignor to National Distillers and Chemical Corporation, New York, N.Y.
Filed Apr. 28, 1970, Ser. No. 32,681
Int. Cl. B60s 1/40
U.S. Cl. 15—250.32                                           10 Claims

ABSTRACT OF THE DISCLOSURE

A clip for a windshield wiper blade, comprising a first portion which is adapted to be pivotally secured to a windshield wiper blade, and a second portion having an elongated section adapted to slideably receive therein one end of an actuating arm that is connected at its other end to the drive mechanism for the blade. An external flexible and resilient spring member is secured to the clip and its outer end is adapted to extend over the elongated section in blocking relation to a portion of the arm to retain the arm within clip section. The spring member may be manually lifted out of blocking relation to the arm when it is desired to disconnect the arm from the wiper blade.

BACKGROUND OF THE INVENTION

This invention relates generally to a new and improved clip for a windshield wiper blade. More particularly, the invention relates to such a clip having an external flexible and resilient spring member which is adapted to be positioned in blocking relation to a portion of the actuating arm of the wiper blade assembly to releasably secure the arm to the wiper blade.

Heretofore, many clips for windshield wiper blades have utilized an internal spring member or the like for the purpose of engaging a locking portion on the end portion of the actuating arm for the wiper blade assembly to releasably secure the arm to the wiper blade. Such internal spring clips have been subject to one or more of the following disadvantages:

(1) Since the internal spring must support as well as retain the end of the actuating arm within the clip, the spring tends to weaken and lose some of its resiliency after prolonged usage;

(2) The relative movement between the internal spring, the actuating arm and the clip results in wear of the spring, particularly when dirt is present between the spring, arm and clip surfaces, and this wear not only serves to weaken the spring but also results in a loose fit between the actuating arm and the clip which results in poor wiper action;

(3) It is sometimes difficult to manually move the internal spring to a release position wherein the arm can be removed from the clip.

The few prior art clips that have utilized external spring members or the like for securing an actuating arm to a wiper blade have also been subject to certain disadvantages. For example, they have been complicated in construction, difficult and expensive to manufacture, unreliable in operation and/or difficult to use during the locking or unlocking of the actuating arm to or from the wiper blade. In one instance, where a one-piece plastic clip has been proposed, the integral spring or locking arm thereof has been subject to varying degrees of flexibility depending on weather conditions and also has been subject to breakage owing to a lack of flexibility in very cold weather.

The clip of the present invention is not subject to any of the aforementioned disadvantages and, particularly, incorporates other advantages not present in prior art clips for securing actuating arms to wiper blades.

SUMMARY OF THE INVENTION

The new and improved clip of the present invention is adapted to releasably connect an actuating arm to a wiper blade, and comprises a first portion adapted to be pivotally secured to the wiper blade and a second portion having an elongated section in which the end of the actuating arm is slideably received. A flexible and resilient external spring member is secured at one end to the clip. In one embodiment, the spring member extends over the elongated section and terminates at its other end in a tab which extends inwardly into a groove in the upper surface of the elongated section. The elongated section is provided with an upwardly and outwardly extending stop member at the inner end of the groove therein which is adapted to limit the movement of the actuating arm into the elongated clip portion by engagement with an upstanding arm protuberance received within the groove.

As the end portion of the actuating arm is inserted within the channel defined by the elongated section of the clip, the protuberance on the arm engages the tab on the spring member and causes the spring member to bend upwardly so that the protuberance can ride under the tab. When the protuberance engages the stop member at the inner end of the groove, it clears the spring member tab and the spring member then resiliently moves downwardly to a position wherein the tab is in blocking relation to the protuberance on the arm to prevent removal of the arm from the clip. When it is desired to remove the arm from the clip, the spring member may be manually lifted to a position wherein the tab is moved upwardly a sufficient distance so that the protuberance on the arm may be moved outwardly without engagement therewith.

In a second embodiment of the present invention, the external spring member is provided with inwardly extending tabs on both sides thereof that are adapted to be engaged within recessed portions in the actuating arm when it is received within the elongated section to thereby releasably lock the arm within the clip. Again, when it is desired to remove the arm from the clip, the spring member is manually moved upwardly to a position wherein the tabs are no longer received within the recessed portions of the arm.

BRIEF DESCRIPTION OF THE DRAWING

FIG. 1 is a side elevational view, with parts broken away, of a windshield wiper blade and actuating arm assembly incorporating the clip of the present invention;

FIG. 2 is an enlarged side elevational view, partly in section and with parts broken away, of the clip shown in FIG. 1 for connecting the actuating arm to the wiper blade;

FIG. 3 is an end elevational view, partly in section and with parts broken away, of the clip shown in FIG. 2;

FIG. 4 is a side elevational view, partly in section and with parts broken away, of a modified form of clip for connecting an actuating arm to a wiper blade; and FIG. 5 is an end elevational view, partly in section and with parts broken away, of the clip shown in FIG. 4.

DESCRIPTION OF THE PREFERRED EMBODIMENTS

FIG. 1 illustrates a wiper blade assembly wherein a wiper blade 10 of any suitable construction having a wiper element 12 is connected to the actuating arm 14 by the clip 20 of the present invention. The actuating arm 14 is adapted to be connected in any suitable or conventional manner to a drive mechanism (not shown).

As shown in FIGS. 2 and 3, the clip 20 of the present invention, which may be formed of any suitable material such as aluminum, comprises an upper panel 22 and a pair of substantially parallel, depending side panels 24 which are provided with aligned holes 26 near one end of the clip for the purpose of enabling the clip to be pivotally secured in any suitable manner to a wiper arm portion 28 shown in broken lines in FIG. 3.

The upper panel 22 and side panels 24 are tapered inwardly toward the other end of the clip to form an elongated section 30 which defines a channel 32 that is adapted to slideably receive an end of the actuating arm 14 therein. In the elongated section 30, the side panels 24 are bent inwardly to form portions 34 thereof that are substantially parallel to the adjacent portion of the top panel and serve to define the bottom of the channel 32. The portion of the top panel 22 in the elongated clip section 30 comprises an upwardly and outwardly extending stop member 36 and an elongated groove 38 extending longitudinally from the stop member 36 to the outer end of the clip section 30. The groove 38 is of sufficient width to receive an upstanding protuberance 40 on the actuating arm 14 when the arm is inserted within the channel 32 of the elongated section 30. The stop member 36 serves to limit the movement of the protuberance 40 in the groove 38 and thus limits the extent to which the actuating arm 14 may be inserted into the channel 32 of the clip section 30.

A flexible and resilient spring member 42, formed of any suitable material such as aluminum, is secured at one end thereof to the upper panel 22 by a rivet 44 or by any other suitable means. The spring member 42 extends longitudinally over the elongated clip section 30 and the stop member 36, and is formed at its other end with a downwardly extending portion 46 that terminates in an inwardly extending narrow tab 48 that is disposed in the groove 38 of the clip section 30 in spaced relation to the stop member 36 in the normal position of the spring member 42.

In operation, when it is desired to connect the actuating arm 14 to the wiper blade 10 through the use of the clip 20 of the present invention, the end of the actuating arm 14 is slidably inserted into the channel 32 defined by the elongated clip section 30. As the arm 14 is being inserted into the channel 32, the protuberance 40 thereof engages the tab 48 of the spring member 42 and moves it upwardly to the position shown in broken lines in FIG. 2, wherein the protuberance 40 can move under the tab 48 and inwardly in the groove 38 until it engages the stop member 36. In this position, the protuberance 40 is disposed inwardly of the inner end of the tab 48 and thus the tab 48 is moved downwardly by the resiliency of the spring member 42 to the position shown in FIGS. 2 and 3 wherein it extends into the groove 38 in blocking relation to the protuberance 40 to prevent movement of the arm 14 outwardly of the channel 32.

When it is desired to remove the arm 14 from the clip 20, the outer end of the spring member 42 is manually moved upwardly to the position shown in broken lines in FIG. 2 wherein the tab 48 is disposed above the protuberance 40 such that the protuberance may be moved outwardly in the groove 38, thereby enabling the arm 14 to be removed from the channel 32 in the elongated clip section 30. Since the stop member 36 extends outwardly over the inner end of the tab 48, the stop member serves to limit the upward movement of the tab 48 and the spring member 42.

FIGS. 4 and 5 disclose a second embodiment of a clip 200 for connecting an actuating arm to a wiper blade. The clip 200 is very similar in construction and operation to the clip 20 shown in FIGS. 2 and 3, except that the clip 200 is modified in construction to receive and cooperate with an actuating arm 214 having a pair of aligned notches or recesses 216, rather than an upstanding protuberance, formed on the end portion thereof which is received within the clip 200.

In the clip 200, the upper panel 222 and side panels 224 are tapered inwardly to form an elongated section 230 at one end of the clip which defines a channel 232 in which the end of the actuating arm 214 is slideably receivable. The upper panel 222 and the side panels 224 are cut away or recessed at 231 in the elongated section 230 for the purpose of accommodating a pair of depending arms 241 extending from the sides of the external spring member 242 secured to the upper panel 222. Each of the depending arms 241 comprises an inwardly extending tab 243 that is inclined upwardly and outwardly and is formed with an upstanding portion 245 at the outer end thereof. The tabs 243 and the upstanding portions 245 thereof are adapted to be received within the recesses 216 in the arm 214 when it is positioned within the channel 232, in the manner shown in FIGS. 4 and 5. The spring member 242 terminates in a downwardly and inwardly curled outer end 247 which engages the arm 214 when the tabs 243 are disposed in the recesses 216.

In operation, when it is desired to connect the actuating arm 214 to a wiper blade through the use of the clip 200 of the present invention, the end of the arm 214 is inserted within the channel 232 in the elongated clip section 230. As the arm 214 is so inserted, its end engages the upstanding portions 245 of the inclined tabs 243 on the spring member 242 to force the tabs 243 and the spring member 242 upwardly to a position wherein the arm 214 is slideable under the tabs. When the arm 214 is moved inwardly a sufficient distance for the tabs 243 to be vertically aligned with the recesses 216 in the arm, the resiliency of the spring member 242 causes the tabs and the upstanding portions 245 thereof to be moved downwardly into the recesses 216 to lock the arm 214 in place within the clip 200. If desired, any suitable or conventional means, such as a downwardly extending portion (not shown) on the upper panel 222, could be provided to limit the inward movement of the arm 214 in the channel 232.

When it is desired to remove the arm 214 from the clip 200, the end 247 of the spring member 242 is grasped and manually moved upwardly to the position shown in broken lines in FIG. 4, wherein the tabs 243 are moved out of the recesses 216 and the arm 214 is free to be moved out of the channel 232 defined by the clip section 230.

What is claimed is:

1. A clip for connecting a windshield wiper blade to an actuating arm, said clip comprising:
   means for enabling said clip to be secured to said blade,
   an elongated section at one end of said clip defining a channel adapted to slideably receive an end portion of said arm therein, and
   a flexible and resilient spring member secured at one end to said clip and extending longitudinally over the outer end of said elongated section, said spring member comprising a tab near the other end thereof adapted to be disposed in blocking relation to said arm end portion when it is positioned within said channel and when said spring member is in its normal position to thereby prevent removal of said arm end portion from said channel.

2. The clip of claim 1 further comprising a top panel and a pair of substantially parallel side panels which form said elongated section, said side panels being bent inwardly into substantially parallel relation with said top panel to form the bottom of said elongated section.

3. The clip of claim 2 wherein said side panels have aligned holes therein for enabling said clip to be pivotally secured to said blade.

4. The clip of claim 2 wherein a portion of said top panel in said elongated section comprises a groove extending longitudinally therein to the outer end of said elongated section, and wherein said spring member tab extends inwardly into said groove in spaced relation to the inner end thereof when said spring member is in its normal position, said groove being adapted to receive a protuberance on said arm end portion when it is inserted in said channel, and said tab being adapted to be disposed in blocking relation to said protuberance when said spring member is in its normal position.

5. The clip of claim 4 wherein a stop member extends upwardly from said top panel at the inner end of said groove, said stop member being adapted to be engaged by said arm protuberance.

6. The clip of claim 5 wherein said stop member comprises an outwardly extending portion that is disposed over said spring member tab to limit the outward movement of said spring member.

7. The clip of claim 2 wherein said spring member comprises a pair of arms depending from opposite sides thereof and extending over the adjacent portion of said elongated section, each of said arms comprising an inwardly extending tab adapted to be received within a recess within said arm end portion to prevent it from being removed from said channel.

8. The clip of claim 7 wherein said tabs are inclined upwardly and outwardly toward the outer end of said elongated section, and wherein each of said tabs comprises an upwardly extending portion at the outer end thereof.

9. The clip of claim 8 wherein a portion of said elongated section is recessed to enable said tabs to be received within said arm recesses.

10. The clip of claim 9 wherein said spring member has a downwardly and inwardly curled outer end which is adapted to engage the adjacent surface of said arm when it is positioned within said channel.

References Cited

UNITED STATES PATENTS

| | | | |
|---|---|---|---|
| 2,915,770 | 12/1959 | Scinta | 15—250.32 |
| 3,056,160 | 10/1962 | Oishei et al. | 15—250.32 |
| 3,071,798 | 1/1963 | Okleja | 15—250.32 |
| 3,135,983 | 6/1964 | Oishei | 15—250.32 |
| 3,254,358 | 6/1966 | Wise | 15—250.32 |

FOREIGN PATENTS

| | | | |
|---|---|---|---|
| 1,096,916 | 12/1967 | Great Britain | 15—250.32 |

PETER FELDMAN, Primary Examiner